United States Patent [19]

Eskeli

[11] 4,050,253

[45] Sept. 27, 1977

[54] THERMODYNAMIC MACHINE

[76] Inventor: Michael Eskeli, 7994-41 Locke Lane, Houston, Tex. 77042

[21] Appl. No.: 685,998

[22] Filed: May 13, 1976

Related U.S. Application Data

[63] Continuation-in-part of Ser. No. 674,398, April 7, 1976.

[51] Int. Cl.² ............................................. F02C 1/04
[52] U.S. Cl. ..................................................... 60/650
[58] Field of Search ................... 60/650, 682, 683, 721

[56] References Cited

U.S. PATENT DOCUMENTS

| | | | |
|---|---|---|---|
| 3,834,179 | 9/1974 | Eskeli | 60/682 |
| 3,938,336 | 2/1976 | Eskeli | 60/682 |
| 3,949,557 | 4/1976 | Eskeli | 60/721 X |

Primary Examiner—Allen M. Ostrager

[57] ABSTRACT

A method and apparatus for the generation of power and for the generation of higher temperature heat, by using a work process with isentropic compression of a gaseous working fluid, and the expansion of the working fluid with heat addition and expansion adiabatically. Work is supplied to the working fluid during compression and work is extracted during expansion from the working fluid; the difference is the work output for the system. Heat is added into the working fluid during the expansion, and such heat addition may be in steps with compression between such steps. Heat is removed from the working fluid at a higher pressure than the heat addition, with the heat removal at constant pressure normally. Working fluids include air, nitrogen and oxygen.

6 Claims, 7 Drawing Figures

THERMODYNAMIC MACHINE

CROSS REFERENCES TO RELATED APPLICATIONS

This patent application is a continuation-in-part application of "Power Generator," filed Apr. 7, 1976, Ser. No. 674,398.

BACKGROUND OF THE INVENTION

This invention relates to power generators and thermodynamic machines where a working fluid is circulated in a system and is subjected to alternate compression and expansion with accompanying addition and removal of work from the working fluid, and the addition and removal of heat from the working fluid.

Previously, similar machines have been constructed, but their work cycle has been generally a continuous flow type, resulting in a machine wasteful of energy.

SUMMARY OF THE INVENTION

It is an object of this invention to provide a thermodynamic machine where the working fluid is subjected to alternate compression and expansion with such compression and expansion being for many processes within the system non-flow, thus producing an improved efficiency and providing a machine that can utilize many low temperature heat sources for the generation of higher temperature heat, and power.

DESCRIPTION OF PREFERRED EMBODIMENTS

Figure 1:
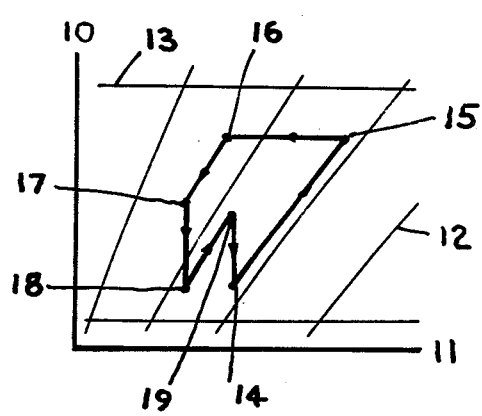
FIG. 1 is a pressure-internal energy diagram for a typical work cycle for a thermodynamic machine to generate heat and power.

Referring to FIG. 1, therein is shown a pressure-internal energy diagram for a working fluid, with the work cycle shown thereon. 10 is pressure line and 11 is internal energy or enthalpy line, 12 is constant entropy line. 14-15-16-17-18-19-14 is the work cycle, with lines 14-15, 18-19 and 16-17 representing isentropic processes, 17-18 and 19-14 representing isothermal processes and line 15-16 being a heat removal line at constant pressure.

Figure 2:
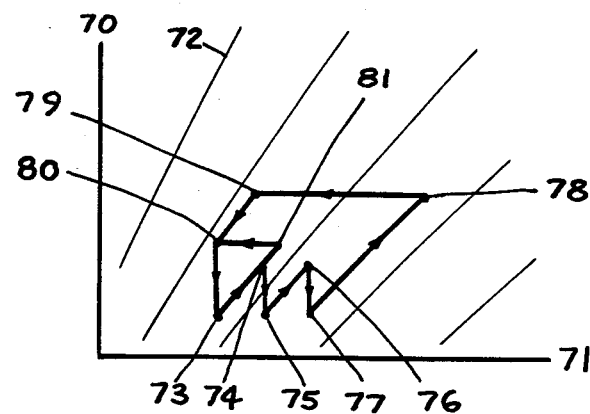
FIG. 2 is another pressure-internal energy or enthalpy diagram for the generation of heat and power.

In FIG. 2, another pressure-internal energy or enthalpy diagram is shown, with 70 being pressure line and 71 being internal energy or enthalpy line, 72 being enthalpy line. Two work cycles are shown on the diagram, one is 73-74-75-76-77-78-79-80-73, and the other being 73-81-80-73. Both cycles are similar, and heat is added in both cycles isothermally and heat is removed at constant pressure.

Figure 3:
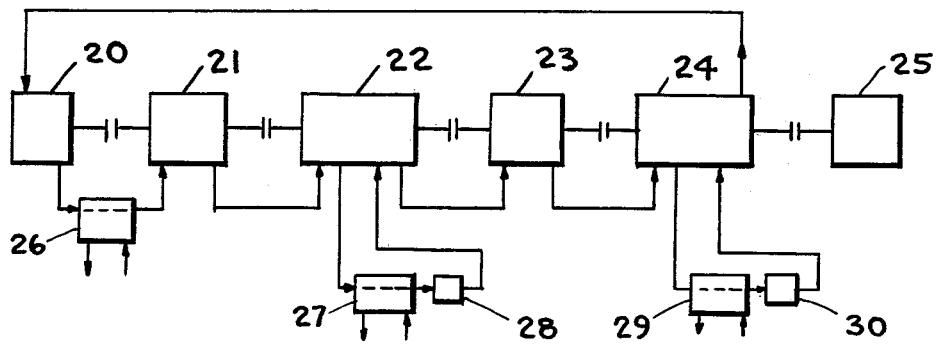
FIG. 3 is a schematic diagram of a power and heat generator.

In FIG. 3, a schematic diagram of a system is shown; this system is arranged to perform the work cycle shown in FIG. 1. Similar system can also be arranged for the work cycles of FIG. 2. 20 is a compressing means to compress the working fluid as required by line 14-15, 26 is a heat exchanger and removes heat in accord with line 15-16, 21 is an expander that expands the gas in accord with line 16-17, 22 and 24 are expanders that expand the working fluid with heat addition, in accord with lines 17-18 and 19-14; 23 is a compressing means to compress the working fluid in accord with line 18-19, of FIG. 1. The items 20, 21, 22, 23 and 24 are connected to load 25, which may be an electric generator. 27 is a heat addition heat exchanger and 28 is circulator for heat transfer fluid to be used in item 22, expander. 29 and 30 are similarly a heat addition heat exchanger and circulator for item 24 heat transfer fluid. The use of items 27, 28, 29 and 30 is optional, as may be required for the types of working fluid expanders used a items 22 and 24. The number of items to form the system shown in FIG. 3, may be reduced if desired by combining the functions of the components. Similarly if the work cycle shown in FIG. 2, 73-81-80-73 is used, the number of components for the system of FIG. 3 will be less, while still meeting the requirements of such cycle.

Figure 4:
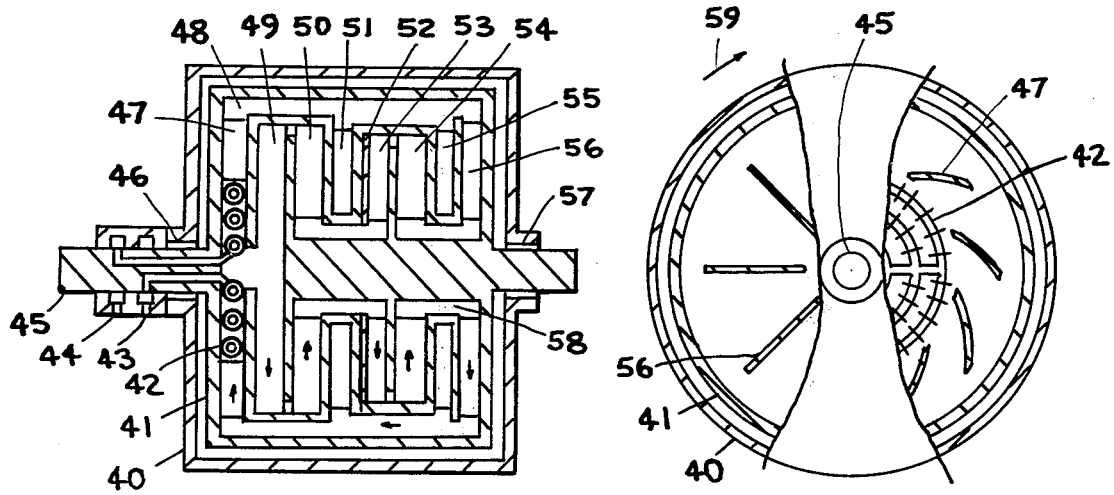
FIG. 4 is a cross section and FIG. 5 is an end view of a centrifuge type machine for generating heat and power in accordance with the diagram of FIG. 2.

In FIG. 4, an axial cross section of a centrifuge type unit to perform the work cycle of FIG. 2 is shown; similar rotor can be also constructed to perform the cycle of FIG. 1. 40 is casing, 41 is rotor, 42 is heat addition heat exchanger, 43 and 44 are entry and exit for heating fluid, 45 is shaft, 46 and 57 are bearings, 47 is a vane in fluid expansion passage, corresponding to line 79-80 in diagram of FIG. 2, 48 is fluid passage, 49 is compression passage with a vane, 50 is expansion passage with a vane, 51 and 55 are heat addition fluid passages with fins for transferring heat from fluid in the peripheral passage into the fluid being expanded in passages 50 and 54, 52 is a layer of thermal insulation which may be used, 53 and 56 are compression passages and 58 is working fluid passage near shaft.

Figure 5:
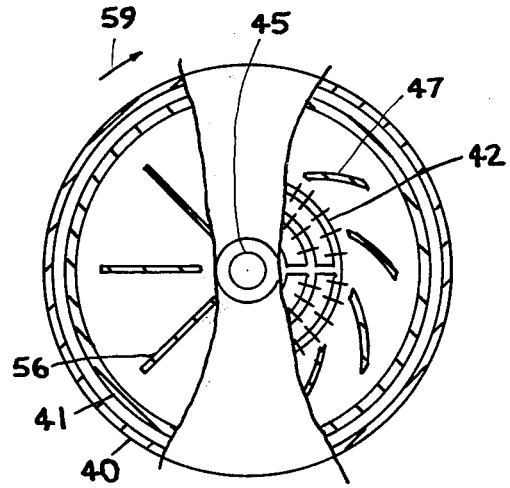

In FIG. 5, an end view of the unit of FIG. 5 is shown. 45 is shaft, 47 are vanes shown here curved for generation of power when the rotor 40 rotates in direction shown by 59, 42 is heat addition heat exchanger, 41 is rotor and 56 are vanes.

Figure 6:
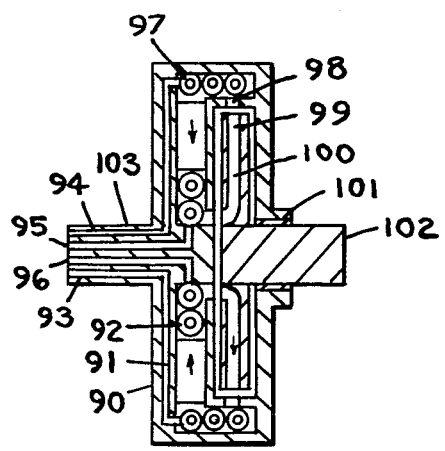
FIG. 6 and FIG. 7 are a cross section and an end view of a unit to generate heat and power in accord with FIG. 2.
Figure 7:
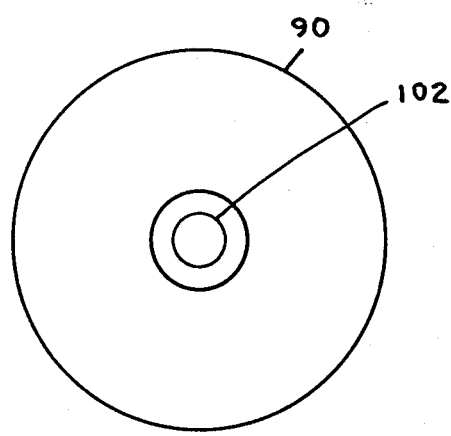

In FIG. 6 is shown a cross section of a centrifuge type rotor to perform the cycle 73-81-80-73 of FIG. 2. The unit has two rotors, 90 and 99, and a heat addition heat exchanger 92 and heat removal heat exchanger 97. 91 is vane, 93 and 94 are entry and exit for heat removal heat transfer fluid, 95 and 96 are entry and exit for heat addition heat transfer fluid, 98 are nozzles for the working fluid and are optional, 100 are second rotor vanes, 101 is bearing, 102 is second rotor shaft and 103 is first rotor shaft In FIG. 7, end view of the unit of FIG. 6 is shown. 90 is first rotor, and 102 is second rotor shaft.

In operation, the unit of FIG. 3 is started by a starting motor or drive. The working fluid is compressed, heat is removed, and then the fluid is expanded first adiabatically and then with heat addition. Then the working fluid is again compressed adaiabatically and then expanded with heat addition, which completes the cycle. Work is used during compression and released during expansion; the difference between these work quantities is the amount of work put out by the system. Heat is removed in the heat exchanger at constant pressure, and heat is added during the two steps of expansion.

The operation of the centrifuge type unit is similar, except that all the various steps of the work cycle are done within a single rotor, using centrifugal force to compress and expand against.

In the pressure-internal energy diagrams, the heat addition is shown to be carried either in a single step, or in two or three steps. As many steps as desired may be used. Heat removal is in a single step, or using the removed heat to satisfy the heat demand of the heat additions, as in FIG. 4.

Work may be extracted from the working fluid in an expander, as shown in FIG. 3, or such heat may be extracted in a centrifuge wheel, as shown in FIG. 4 or FIG. 6.

The basis for the operation of the devices shown herein is in the physical properties of certain gaseous working fluids that can be used with the systems shown herein. Working fluids that can be used are such as air, nitrogen, oxygen or carbon monoxide. Other fluids with similar properties can also be used. The amount of work required for compression of the working fluid in a nonflow process is less than the amount of work released in a constant temperature expansion; thus, the work required to compress is less than work released during isothermal expansion. Also, for some fluids, such as nitrogen, in a two step process as shown in FIG. 1, the work of compression is less than the work of expansion even in a steady flow unit, and therefore, the system of FIG. 3 will function in delivering heat even when a steady flow process is used. The use of additional steps, such as shown in FIG. 2, will further improve the operation of the system. Thus, the systems shown herein can be used to provide a power generator that also delivers heat, or a heat pump that is self powered.

The unit of FIG. 6 is shown with two rotors; similarly, two rotors can be used with the unit of FIG. 4.

The heat addition for the system of FIG. 3 is shown with separate heat transfer fluid. Other methods, such as direct heating of working fluid may be used, for adding the heat into the working fluid. It should be also noted that the heat addition to the working fluid need not be at a constant temperature; however, the heat addition should be during expansion.

The apparatus shown in FIG. 4 and FIG. 6, is similar to the apparatus shown in my previous U.S. Pat. No. 3,926,010, Rotary Heat Exchanger, and to my previous U.S. Pat. No. 3,931,713, Turbine with Regeneration.

The heat removal for the unit in FIG. 6 is by a separate heat removal heat exchanger. Similar heat removal heat exchanger located in the passage 48, may be provided for the unit of FIG. 4, and the regenerative passages 51 and 55 may be deleted.

The power generation using the methods and apparatus of this invention requires primarily equipment that is capable to perform the compression of the working fluid in a non-flow process. Such apparatus may be of the vane type, piston type, or other positive displacement type; also, centrifuge type equipment may be used. Exception to this are applications where the main purpose is to generate heat; for such applications, steady flow type equipment may be used if desired.

I claim:

1. A method of generating power comprising:
   a. compressing a compressible working fluid isentropically in an approximately non-flow process;
   b. removing heat from said working fluid after the compression;
   c. expanding said working fluid with heat addition and generation of power.

2. The method of claim 1 wherein the heat addition is carried out in more than one step, with said working fluid being compressed between each step.

3. The method of claim 1 wherein the heat removed in the heat removal process is used as heat added into said working fluid during the expansion and heat addition step.

4. In a power generator wherein within a rotating rotor a compressible working fluid is compressed and then expanded, the improvement comprising:
   a. compressing said working fluid adiabatically by centrifugal force in an outwardly extending fluid passage within said rotor;
   b. removing heat from said working fluid downstream of said compression in a heat exchanger carried by said rotor;
   c. expanding said working fluid in an inwardly extending fluid passage with heat being added into said working fluid during the expansion by a heat exchanger being carried by said rotor.

5. The power generator of claim 4 wherein at least a portion of said outwardly extending fluid passage is within a second rotor.

6. The power generator of claim 4 wherein said working fluid heat addition during the expansion is carried out in steps, with a heat addition heat exchanger being provided for each step of expansion.

* * * * *